United States Patent Office 3,004,139
Patented Oct. 10, 1961

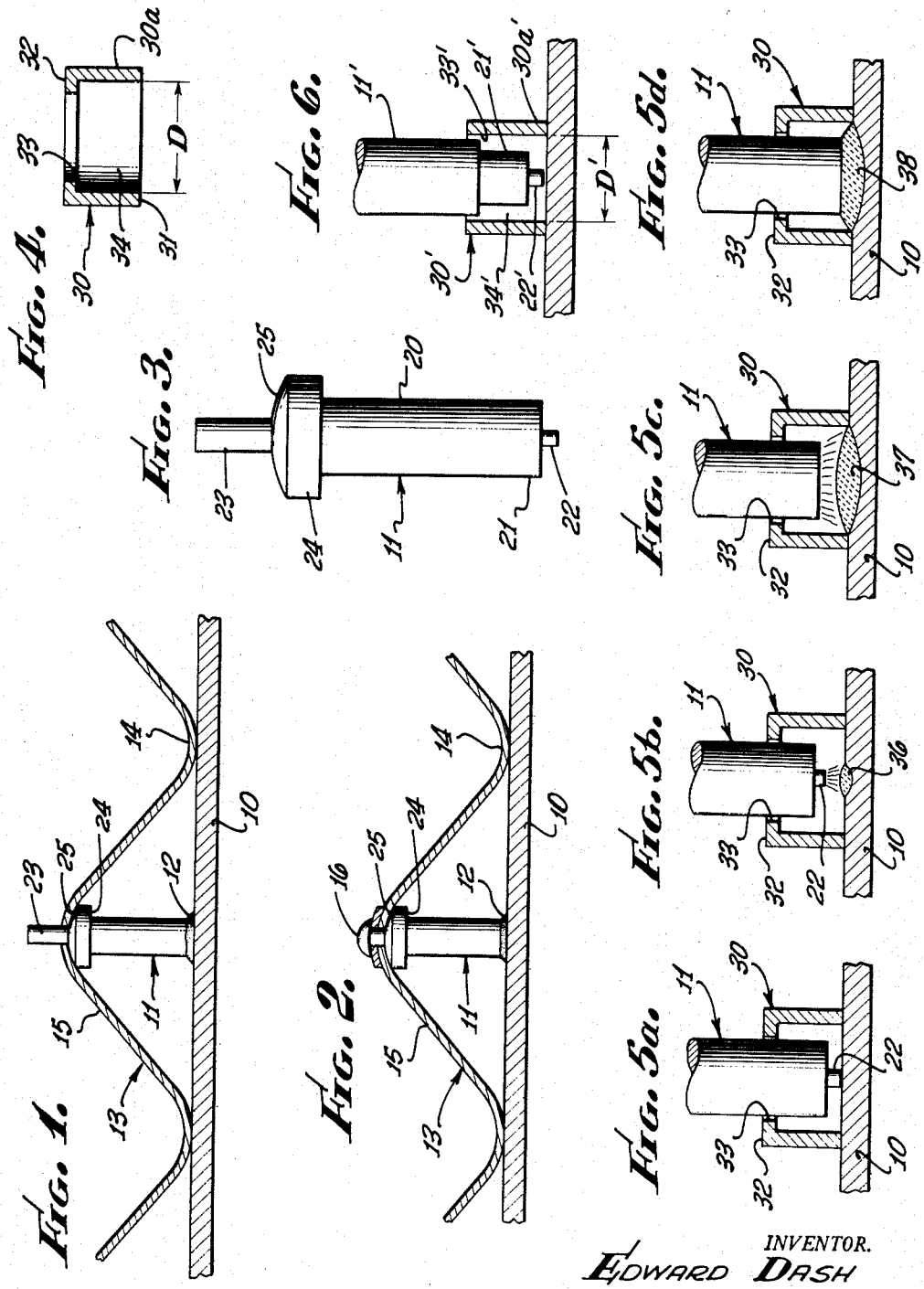

3,004,139
WELDING STUD AND FERRULE CONSTRUCTION FOR ELECTRICAL ARC WELDING
Edward Dash, 2043 Gaylord St., Long Beach 13, Calif.
Original application Apr. 30, 1956, Ser. No. 581,458. Divided and this application Jan. 29, 1959, Ser. No. 790,014
16 Claims. (Cl. 219—99)

This invention relates to a welding stud and ferrule construction for electrical arc welding and more particularly to a welding stud and welding ferrule combination wherein a welding stud has an unfluxed welding end with a projection tip and a welding ferrule has a chamber specifically related to the welding stud. The invention also relates to a welding stud construction for use with corrugated sheet-like roofing and siding members to secure such sheet-like members in weathertight, nonrattling relation on supporting frame members.

This application is a divisional application of my copending application Serial No. 581,458, filed April 30, 1956, entitled "Welding Stud Construction and Method of Arc Welding," said copending application being under final allowance and being abandoned in favor of this present divisional application.

Corrugated roofing and siding sheet-like members heretofore have been secured to supporting frame members such as purlins by the use of welding studs welded at one end to the purlin and provided with a narrow shoulder defined by a slightly reduced end portion or rivet extension at the other end of the stud. After such studs have been welded to the purlins, corrugated sheet-like members are positioned so that the crowns of the said sheet-like members rest on the welded studs. A sharp blow delivered by a rubber-headed hammer to the crown of the sheet-like member at the stud location causes a rivet extension to pierce and to be drawn through the sheet-like member and its crown. A washer may then be placed over the rivet extension of the welded stud, and the said rivet extension then is upset by hammer blows usually made with a rivet set tool. These hammer blows materially weaken the sheet-like member resting against the narrow shoulder of the stud to such an extent that often the original pierced hole in the corrugation is enlarged and said corrugation is driven beneath the narrow shoulder provided on the stud. Such frequent failures in installation necessitate time consuming and costly repairs. Even if the original pierced hole is not immediately enlarged during the hammer blows, the weakened area of the sheet-like member often fails during service because of alternate high stresses and strains encountered during heavy winds. Thus, such prior proposed construction becomes so loose that the sheet-like member commences to rattle during even minor winds, creating such loud noises within the building that personnel cannot work efficiently therein. More important, such defect of prior constructions result in water leakage during rain storms and exposure to other weather conditions existing outside the building. This defeats the original purpose of the metal roofing and siding construction and providing weathertight shelter, and again, necessitates costly repairs.

In the above prior proposed installation of corrugated metal roofing and siding as well as in other installations, prior proposed welding studs used with refractory ferrules for stud welding have included a welding flux at the welding end of the stud in order to facilitate and accomplish the formation of a sound weld. The provision of a welding flux on a welding end required additional machining operations at the welding end, complicated manufacture of such studs, and generally increased the cost of such studs. Prior attempt at welding of a stud without welding flux and in accordance with known welding methods resulted in poor initiation and maintenance of a welding arc which caused the welding end to short circuit and to solidify to the work member prematurely thereby causing an unsound and a rejected weld.

Moreover some prior ferrules used in combination with flux studs were provided with vents at the base of the ferrule to allow exit of gases and excess weld metal. Exit of such excess metal was often in the form of molten metal spatter which was not only a hazard to personnel, but was also a waste of weld metal. Often such excess metal caused the ferrule to lift from the work which permitted molten metal to escape from underneath the ferrule and thus defeat the purpose of the ferrule which was to confine the weld metal. Such escape of excess metal under these conditions caused unsatisfactory welds. When prior ferrules used in conjunction with these prior studs did not contain vents, excess metal and gases formed within the ferrule would also tend to lift the ferrule from the work and resulted in a dissipation of most of the effective weld metal in the form of spatter, and also produced unacceptable weld. If the ferrule did not lift from the work, the pressure of the gases sometimes would cause the welded metal to be expelled from the top axial opening of the ferrule. If the energy for such welds was reduced so that weld metal was not expelled, the resulting welds were low in strength, penetration of the work was too shallow, and fillets surrounding the weld end of the stud were improperly and nonuniformly formed.

The present invention concerns a stud construction which eliminates the objectionable features and disadvantages indicated above. The stud construction of the present invention not only eliminates installation failures of the sheet-like members when hammer riveting blows are applied but also effects better weatherproofing. The stud construction of this invention incorporates an integral projection tip which does not carry loading flux even in large stud diameters of greater than one quarter of an inch. The stud of this invention is thus economical to produce. In addition, it has been found that arc initiation and maintenance by these studs are superior, the arc being maintained in a sturdier and stronger manner with resultant stronger and more uniform welds.

Ferrules used in conjunction with the above described stud and in the method of this invention are constructed so as to confine practically all of the weld metal when a wide range of welding energy is supplied and such ferrules are preferably unvented at the lower end thereof. Expulsion of weld metal from the ferrule is prevented and the ferrule stud relation also assists in creating good arcing conditions. The ferrule construction assists in the formation of a properly formed uniform fillet around the stud, proper penetration of the work member, and strong sound welds.

The principal object of this invention is to disclose and provide a novel welding stud construction and a novel ferrule construction for use therewith.

An object of this invention is to disclose and provide a welding stud for use in securing and attaching sheet-like members to supporting frame members in weathertight nonrattling relation.

Another object of this invention is to disclose and provide a welding stud construction which provides a stop means and a large bearing area for supporting opposed portions of a supported sheet-like member.

A more specific object of this invention is to disclose and provide a welding stud having a shank with a fastening end at one end and an integral upset annular support collar between the shank and the fastening end, the support collar being provided with a top curved surface facing the fastening end affording a stop and enlarged bearing area for a supported member.

Another object of this invention is to provide a novel stud construction provided with a welding end with a projection tip and a ferrule of novel construction cooperable therewith during welding with said stud.

A still further object of this invention is to provide a novel stud construction provided with a projection tip without the flux and in which the arc is initiated and maintained in a strong and forceful manner.

A further specific object of this invention is to disclose and provide a novel stud and ferrule combination wherein specific relationships between the stud and the ferrule provide a construction which when employed with the method of this invention as described and claimed in a copending application divided out of said application Serial No. 581,458 which produces sound uniform acceptable welds without the use of flux on the welding end of the stud construction.

Other objects of the invention include the provision of a refractory ferrule designed to contain and confine remolten metal in the weld area to concentrate the heat of the arc in the weld area during the weld period, and to reduce oxidation of molten metal during the arcing period by restricting access of air to the weld area.

These and many other objects and advantages of this invention will be readily apparent from the following description and drawings of an exemplary embodiment of this invention.

In the drawings:

FIG. 1 is a fragmentary sectional view of a corrugated metal member impaled on a stud of this invention and before riveting or securing of the fastening end.

FIG. 2 is a fragmentary sectional view of a corrugated metal member secured to a frame member by a welding stud of this invention.

FIG. 3 is an elevational view of a stud embodying this invention.

FIG. 4 is a sectional view of a ferrule.

FIG. 5a, FIG. 5b, FIG. 5c and FIG. 5d are successive fragmentary views showing a welding operation with a stud and ferrule shown in FIGS. 3 and 4.

FIG. 6 is a sectional view of a modified ferrule and stud combination embodying the invention.

In FIGS. 1 and 2 is shown a siding or roof construction embodying a welding stud of this invention, such construction comprising a frame or work member 10 to which a welding stud 11 of this invention may be welded at 12 at its welding end. A corrugated sheet-like metal member 13 is secured to the work member 10 by means of a plurality of spaced welding studs 11. In the example shown, the sheet-like metal members formed with corrugations which provide a plurality of spaced parallel valleys 14 and ridges or crowns 15 suitably curved in well known manner. The top of a ridge 15 is supported by stud 11 and is impaled upon a fastening end 16 of the stud. Between the curved ridge 15 of the member 13 and the fastening end 16 may be provided a circular washer 17 which may include a curved form to correspond with the curvature of the ridge. The fastening end 16 in this example is riveted securely to the washer and the sheet-like member, but it is understood that the fastening end may include a threaded portion which may carry a nut to provide securement of the ridge to the stud.

The exemplary welding stud 11 may be made of any suitable metal such as low carbon steel and may be capable of being produced in any convenient well known manner as by automatic screw machine methods. The welding stud 11 may comprise an elongated metal shank 20 of uniform cross-section such shank being either circular, rectangular, polygonal or other suitable cross-section or shape. A welding end 21 may be provided with an integral projection tip 22 coaxial with shank 20. The exemplary welding end 21 does not carry nor is it provided with any flux material or substance normally used in welding, and such a welding end is herein referred to as being "unfluxed." In this example welding end 21 is of the same material as shank 20.

The dimensions of projection tip 22 are critical. It has been found that an exemplary projection tip 22 should be, if cylindrical, approximately 3/32 of an inch in diameter or less, or if other than cylindrical, have an equivalent of cross-sectional area of approximately .007 square inch or less. The latter cross-sectional area of .007 square inch may obtain for any diameter or cross-sectional area of welding end 21.

The length of projection tip 22 is a principal factor in controlling the length of the arc and in the prevention of short circuiting of the arc in the welding method of this invention as described later. Exemplary length of projection tips 22 may vary from approximately 3/64 of an inch to 1/8 of an inch for studs having weld end portions of diameters varying from 3/16 inch to 5/8 inch respectively.

The dimensions of a projection tip 22 are closely related to the cross-sectional area of a ferrule welding chamber as later described, and the amount of volume of weld metal deposited from the welding end of the stud. I have found that for optimum welds using the minimum cross-sectional area of a ferrule chamber, the volume of metal in the projection tip would be approximately 10% or less of the total weld metal deposited, that is, the metal of the projection tip plus that metal portion (burn off length) of the weld end which becomes molten.

While the shape of the projection tip 22 is exemplarily illustrated as having a uniform circular cross-section, it is understood that the shape of the projection tip is not critical but may be dome-shaped, cone-shaped, annular-shaped, or some other desired shape as long as the volume of metal in the projection tip is related to the ferrule chamber and weld metal deposited as described above and it is understood that the phrase "projection tip" includes all such different shapes and configurations. Projection tip 22 on welding end 21 serves to eliminate the necessity for a welding flux on the welding end, particularly when employed in accordance with the method of this invention described later.

At the other end of elongated shank 20 is integrally formed a fastening end 23, said fastening end being of reduced diameter, and in the example, is provided with a cylindrical surface. It is understood that fastening end may include threads for cooperation with an associated threaded nut. The diameter of the fastening end 23 is sufficiently small so as to facilitate impaling of the sheet-like member thereupon while at the same time providing sufficient metal material for riveting said fastening end to secure the sheet-like member. It is understood that the shank 20 may be of the same or even smaller diameter than fastening end 23 to take advantage of the most economical production method.

Between shank 20 and fastening end 23 may be provided an annular radially outwardly extending collar or support portion 24, said annular support portion having a diameter substantially greater than that of the fastening portion 23 and of the shank 24. In an exemplary stud, the diameter of the annular support portion 24 may be approximately twice that of the shank. The annular support portion 24 is integrally formed with shank 20 and fastening end 23, and thickness of the annular support portion 24 sufficient to withstand blows of an impaling hammer. The support portion serves as a stop means having a large enough diameter and area to positively position the sheet member on the stud after the sheet members have been impaled and for affording a surface 25 facing the fastening end 23 which has sufficient bearing area to prevent further piercing, tearing, or fracture of the metal of the sheet member surrounding the pierced opening therein by hammer blows or fastening means.

The surface 25 of the upset annular support portion 24 may be shaped to conform to the curvature of the opposed portion to the sheet-like member 13. In an example, the surface 25 comprises a convex curved face which corresponds substantially to the curvature of the sheet-like metal member 13. It will thus be apparent that when the sheet-like metal member 13 is impaled over a stud of this invention, at the margins of the opening provided by such impaling will conform to the curvature of the surface 25 and will be supported thereby as a snug fitting. After a washer 17 has been placed on the fastening end and the fastening end riveted, it will be apparent that the resulting securement of the sheet-like member 13 to the welding stud provides a substantially leak proof connection. In addition, the support given to the sheet-like member by the annular support portion 24 together with the tight riveting at the fastening end provides a nonloosening, nonrattling construction.

The welding end 21, provided with a nonfluxed projection tip 22, is arranged in cooperative relation with ferrule 30 of a particular novel design and construction so that a stud welding operation in accordance with this invention may be performed without flux and in an improved manner. In FIG. 2, ferrule 30 may comprise a cylindrical open ended hollow body 30a provided with a plain edge face 31 which lies in a plane transverse to the axis of the ferrule body. The plain end face 31 is adapted to seat upon, in full engagement, the opposed surface of a work member 10 to which a stud 11 is to be welded. The opposite end of cylindrical body 30 is provided with an inwardly directed annular lip 32 defining an axial opening 33. The opening 33 is provided with a diameter substantially greater than the diameter of a shank 20 of a stud to be used with the ferrule so that the circular edges of lip 32 will be spaced from the cylindrical surface of a shank of a stud passed therethrough. An example of such spacing is approximately one thirty-second of an inch.

The inner diameter D of the ferrule body in its relation to a welding end 21 of stud 11 to be welded is critical. I have found that the ratio of diameter D to the diameter of the welding end of the stud should be chosen to permit molten droplets of weld metal from the welding end of the stud to spread out thinly upon the work member and not to build up in an axial direction to the extent that a short circuit of the arc may occur by premature fusion between the welding end of the stud and the deposited metal. Thus the critical diameter D of the ferrule weld chamber is a function of the weld end diameter on the stud and of the amount of burn-off of the stud. In optimum welds, a burn-off of approximately one-eighth of an inch of the welding end of the shank is required. For such an optimum burn-off, the minimum diameter D should be the product of 1.4 times the diameter of the welding end 21 used. Preferably, the diameter D should not be greater than 1.8 times the diameter of the welding end of the shank used in order to obtain sound welds.

While the above ratios of 1.4 to 1.8 times the diameter of the welding end are usefully employed with weld ends having a projection tip of a length of approximately three sixty-fourths of an inch, I have found that if the projection tip be lengthened so that the volume of metal in the projection tip is approximately ten percent or less of the total metal deposited as defined above, then a minimum ratio of 1.2 times the diameter of the welding end may be used for determining the diameter of the weld chamber and such minimum ratio of 1.2 will not produce short circuiting of a welding arc. Thus, the range of minimum ratios lies from 1.2 to 1.8 and preferably within this range the smaller ratios may be used for large diameter studs and the larger ratios for smaller diameter studs.

I have found that if ratios greater than those described above are used, a larger burn-off from the stud becomes necessary and such results in a larger volume of weld metal being deposited in the ferrule chamber. In position welding, as when welding a stud to a vertical member, gravitational forces tend to accumulate weld metal at the bottom side of the chamber and any excessive weld metal may result in an asymmetrical and relatively weak weld. I have also found that for a stud with a given weld end diameter that the minimum ratio must be increased if the length of the projection tip is reduced. With a given weld end diameter and a given ratio, reduction of length of the projection tip will ultimately produce a condition where short circuiting of the welding arc occurs.

It will be understood that in the description above, the relationship of the welding chamber in the ferrule and the welding end of the stud has been expresesd in terms of diameter and that such critical relationship may be expressed in terms of cross sectional area since the area is a function of the diameter. Thus, in terms of area, the cross sectional area of the welding chamber 34 of the ferrule should lie in the range of 1.96 to 3.24 times the cross sectional area of the welding end 21 of the stud or where the projection tip is lengthened the range may be 1.44 to 3.24.

The above description of the ferrule chamber and stud welding end relationship has been in two dimensional terms. The height of the weld chamber is also of importance and should be sufficient so as to be ineffective in confining melted metal in a longitudinal direction under conditions of welding, that is, melted weld metal is to be relatively unconfined in a vertical direction. Thus, the weld chamber in terms of three dimensional relationship with the stud welding end should have a volume related to the volume occupied by the stud welding end in the chamber whereby the differential volume is sufficient to be ineffective to confine melted metal in a direction along the axis of the stud shank under welding conditions.

It will thus be understood by those skilled in the art that when a ferrule as described above is used in the formation of a weld, the ferrule is held by well-known means and molten metal formed within the ferrule chamber is confined therewithin because the plain edge face of the ferrule rests squarely upon the work member. Since practically all of the weld metal is confined within the ferrule chamber, an effective use is made of such weld metal and a stronger weld is formed. The axial opening 33 at the top of the chamber permits escape of gases therefrom and since there is an outgoing of gases through the space provided by opening 33, oxidation of molten metal during the arc period is substantially reduced because access of air to the weld area is restricted. The internal welding chamber of the ferrule is of sufficient height so that the ferrule is prevented from lifting off the work member because of additional weld metal deposited from increased power input or other causes.

When welding a stud 11 embodying this invention together with a ferrule 30, it is understood that a source of welding current is available as well as a timer and contactor unit to control duration of the welding current. This welding equipment is well-known in the welding art and therefore is not shown or described. The stud 11 may be held by a stud welding gun of well-known form, the chuck of said gun holding the stud at the fastening end. A ferrule 30 may be positioned on the workpiece with the stud centered as indicated in FIG. 5a and the ferrule held by a ferrule holder (not shown). It is understood that welding end 21 of stud 11 is a non-fluxed end and that as shown in FIG. 5a, projection tip 22 initially contacts a work member such as 10.

Upon closure of a starting switch, welding current begins to flow and the stud welding gun mechanism begins to lift or retract the stud from the surface of the work member. As the stud is lifted, an arc is simultaneously formed between the work member and the projection tip of the stud. The distance through which the stud is lifted is predetermined and may usually be approximately one-sixteenth of an inch. The generation of an arc between projection tip 22 and the work member melts the projection tip and also melts an area on the work member opposite the projection tip. A small pool 36, as shown in FIG. 5b, of molten metal, somewhat larger than the original diameter of the projection tip, and of more than superficial depth is thus formed on the work member. The heat from this small pool of molten metal preheats adjacent portions of the work member by conduction. (It will be noted that heat from the arc is confined within the ferrule and that circulation of air within the ferrule is substantially eliminated because of the solid seating of end face 31 of the ferrule on the work member.) By the time the stud has been retracted to its maximum retracted position (has moved approximately one-sixteenth of an inch), the projection tip should be just about completely melted. Preferably, complete melting of the projection tip should occur at the moment of maximum retraction or just thereafter, such timing producing a strong forceful arc between the stud and the work member. At the moment of maximum retraction and complete melting of the projection tip, it will be noted that the welding end is now spaced a distance equal to the sum of one-sixteenth of an inch retraction due to the gun mechanism and also the length of the original projection tip 22 of the stud. This sum is defined as the effective arc length of stud during the weld; such effective arc length being controlled by the length of the projection tip for a constant gun retraction. The preheating of the work member by the small pool of molten metal, the confinement of the heat of the arc, and establishment of a strong arc during retraction, produce a condition which causes the welding end of the stud to be immersed in a centrally established arc which spreads to the full cross-sectional area of the welding end and to a corresponding area on the work member as shown in FIG. 5c. A portion (burn-off of about one-eighth of an inch) of the welding end of the stud melts under the action of the arc and the work member opposed to said end is brought up to molten temperature, thereby forming an enlarged pool 37, as in FIG. 5c, of metal on the member directly opposite the welding end of the stud and bounded laterally by the wall of the ferrule. The enlarged molten pool thus comprises metal melted from the projection tip, from the weld end of the stud, and from the work member, such molten metal penetrating the work member to a considerable depth and being more than superficial melting of such metal.

After a predetermined time has elapsed, which is automatically controlled in well-known manner by the timer unit, the welding current flow is stopped by opening of the contactor and the stud is plunged downwardly by the stud gun mechanism into the molten pool of metal and a weld 38, as in FIG. 5d, is consummated between the stud and the work member when the molten pool solidifies. The ferrule remains around the weld area as the stud gun is lifted and the chuck of the gun is disengaged from the welded stud.

It will be noted that when stud 11 is plunged into the molten pool 37, the entire cross-section of the welding end 21 of the stud is enveloped by molten metal and becomes welded to the work member upon solidification of the molten metal. Displacement of some of the molten metal forms a fillet weld 12 which surrounds the base of the stud and is fused to both stud and work member. This fillet molded laterally by the weld chamber wall of ferrule 30 has a diameter substantially the same as that of diameter "D" of the weld chamber. As shown in FIG. 5d, the height of the fillet is substantially smaller than the height of the weld chamber because the weld chamber does not mold the fillet in the longitudinal direction.

After welding, the overall length of the stud is shorter than the original overall length of the stud by an amount equal to the length of the projection tip and a length defined as "burn-off length." This shortening is caused by the displacement of the molten metal from the welding end of the stud as described above into the fillet. Exemplary burn-off lengths may vary from approximately $\frac{1}{16}$ of an inch to $\frac{1}{8}$ inch for studs having weld end diameters varying from $3\frac{1}{6}$ inches to $\frac{5}{8}$ inch respectively.

It is important to note that during the stud welding operation, the ferrule prevents any splatter of metal because of its solid face-to-face contact with the surface of the metal. The ferrule thus confines the molten pool and assists in producing a solid, uniform, dense weld. During the welding operation described above, it will be noted that gases formed during the process are permitted to escape essentially through the axial port 32 of the ferrule. The heat and the pressure of gases within the ferrule chamber thus tend to prevent entrance of air into the ferrule and oxidation of the molten pool of metal is thereby reduced to a minimum. It should be noted also that the critical diameter of the weld chamber of the ferrule permits the molten metal to flow laterally within predetermined limits, and that the internal height of the weld chamber of the ferrule is sufficient so as to be ineffective in confining molten metal of the pool in a direction longitudinally of the weld chamber. It will be understood that the available space within the weld chamber during welding of the stud is occupied not only by the molten metal at the surface of the work member but also by gases created by the welding operation. Such gases exert a pressure on the melted metal which is a function of the differential volume or available space within the chamber and of the looseness of fit of opening 33 which permits restricted escape of gases longitudinally along the shank of the stud.

If the volume of molten weld metal is predetermined to be a selected amount, then a given diameter or cross sectional area of the weld chamber will permit the given volume of molten weld metal to be of a selected height. If the diameter is increased, then the height of the molten metal will be decreased. Therefore, a preselected diameter D of the weld chamber is an important factor in controlling the distance or actual arc length between the welding end of the stud and the molten metal during the arcing period.

Also, it is important to note that the preselected length of the projection tip of the stud also serves to control the length of arc between the welding end of the stud and the molten pool of metal, after the projection tip has melted. With a given distance of retraction of the gun mechanism, the longer the projection tip, the farther away from the melted metal the welding end of the stud will be, and the longer the length of the arc will be. In other words, the length of the projection tip is directly proportional to the actual arc length between the welding end of the stud and the molten metal. This feature is new and very useful because in some applications of stud welding where a different arc length is required, the arc length may be easily changed by selecting a stud having a projection tip of different length. By the combination of a preselected internal diameter of the ferrule chamber and a preselected length of projection tip, the welding end of the stud can be made to remain far enough away from the molten metal during the entire arcing period, so that the arc is maintained in a strong unwavering manner. Short circuiting to the work member is thus prevented, a condition which would cause the stud to prematurely solidify to the work member. I have found that by using this welding method with a projection tipped welding stud, and a ferrule of the type described, that even in welding studs having a diameter greater than a quarter of an inch a welding flux was not necessary to obtain sound welds. In addition, a fillet of uniform section, shape and density is formed around the weld end of the stud by the selected lateral confinement of molten metal under selected gas pressure as determined by the differential volume or available space in the weld chamber. Virtually no expulsion of weld metal occurs from the ferrule chamber, and deep penetration of the work member is obtained. Initiation of the arc is strong and forceful at the projection tip because of the high current density occurring on the small section of the tip throughout its length. All of these factors contributed to consistently strong, sound welds under a wide range of welding energy conditions.

In FIG. 6 is illustrated a different modification of a ferrule and stud combination embodying this invention. In FIG. 6, a stud 11' includes an unfluxed weld end portion 21' provided with a projection tip 22'. The ferrule 30' may comprise an open ended cylindrical wall 30a defining a weld chamber 34' having a diameter D'. The top open end of the cylindrical wall 30a' defines an axial opening 33' adapted to loosely receive the shank of the stud 11'. The projection tip 22' is constructed as described above and the diameter D' is related to the diameter of the weld end 21' as above described. It will thus be readily apparent that the ferrule 30' may not include a radially inwardly extending flange or lip as in the prior modification in the event the welding end of the stud construction is modified to provide reduced welding end portion 21' while providing a differential volume as defined above. The relationships between the welding stud, ferrule, and projection tips on the weld end portion of the stud described in the prior modification obtain with respect to the present modification shown in FIG. 6, and such a stud and ferrule combination may be employed with the method of the invention described above.

It is understood that various modifications and changes may be made in the welding method described above, and all such changes and modifications coming within the scope of the appended claims are embraced thereby.

I claim:

1. A ferrule for use with a welding stud having a shank with a welding end of selected cross sectional area comprising an open ended hollow body defining a weld chamber and having a plain uninterrupted end face to seat on the surface of a work member, the opposite end of said body having an axial opening greater in area than the cross sectional area of the shank to loosely receive the shank thereinto in spaced relation, the cross sectional area of the weld chamber being not less than 1.96 and not greater than 3.24 times the cross sectional area of the shank, and the length of said weld chamber having an internal height sufficient to contain against expulsion molten metal from a stud in the chamber.

2. In combination with an unfluxed welding stud having a welding end with a projection tip: a ferrule comprising a cylindrical wall having a planar end face at one end for seating on a surface of a work member to confine melted metal and provided with a radially inwardly extending flange at the other end of said wall defining an axial opening to receive in spaced relation the shank of a welding stud, said cylindrical wall and flange defining a weld chamber, the inner diameter of said weld chamber being not less than 1.4 times the diameter of the welding end of the shank of a stud received therein nor greater than 1.8 times the diameter of said welding end, said weld chamber between said flange and said planar end face having a longitudinal dimension sufficient to provide longitudinally extending space for holding molten metal under welding gas pressures within said chamber.

3. In combination with an unfluxed welding stud having a welding end provided with a projection tip: a ferrule of frangible ceramic material including a cylindrical wall having a planar annular edge face at one end to fit against the surface of a work member to confine melted metal; and an inwardly directed annular lip spaced from said edge face and defining an axial opening to receive in spaced relation the shank of a welding stud, the inner diameter of said cylindrical wall being not less than 1.4 times the diameter of the welding end of the shank of said stud whereby preselected lateral flow of melted metal is permitted to prevent accumulation of melted metal sufficient to produce a short circuit during welding, said lip being spaced a sufficient distance from said planar face to provide a weld chamber having a longitudinal space to hold laterally confined melted metal and weld gases.

4. A ferrule for use with an unfluxed welding stud of selected shank diameter and including a welding end, comprising: an open-ended cylindrical body having a weld chamber with a plain end face to seat on the surface of a work member and a radially inwardly extending flange spaced from said face and providing an axial opening having a diameter relatively greater than the shank diameter to loosely receive the shank in spaced relation, the inner diameter of said chamber being not less than 1.4 times the diameter of the welding end of the shank of a stud received therein, said weld chamber having a longitudinal dimension to provide a volume related to the volume occupied by the shank of a stud in the chamber whereby the differential volume is sufficient to contain melted metal within said chamber under conditions of welding while retaining metal in a lateral direction.

5. A ferrule for use with a welding stud having a shank with a welding end of selected cross sectional area comprising: an open ended hollow body defining a weld chamber and having an end face to seat on the surface of a work member, the opposite end of said body having an axial opening greater in area than the cross sectional area of the shank to loosely receive the shank thereinto in spaced relation, the cross sectional area of the weld chamber being not less than 1.44 and not greater than 3.24 times the cross sectional area of the welding end of the shank, said weld chamber having an internal height sufficient to hold against expulsion molten metal from a stud within said chamber.

6. In combination with an unfluxed welding stud having a welding end with a projection tip: a ferrule comprising a cylindrical wall having an end face at one end for seating on a surface of a work member to confine melted metal and provided with an axial opening at the other end of said wall to receive in spaced relation the shank of a welding stud, said cylindrical wall defining a weld chamber, the inner diameter of said weld chamber being not less than 1.2 times the diameter of the welding end of the shank of a stud received therein nor greater than 1.8 times the diameter of said welding end, said weld chamber having an internal height sufficient to retain under welding gas pressures molten metal from a stud within said chamber.

7. A ferrule for use with an unfluxed welding stud of selected shank diameter and including a welding end comprising: an open ended cylindrical body having a weld chamber, one end of said body having an end face to seat on the surface of a work member, and the other end of said body having an axial opening of a diameter relatively greater than the shank diameter to loosely receive the shank in spaced relation, the inner diameter of said chamber being not less than 1.2 times the diameter of the welding end of the shank of a stud received therein, said weld chamber having a height to provide a volume related to the volume occupied by the shank of a stud in the chamber whereby the differential volume is sufficient to contain melted metal and some welding gases in a longitudinal direction under conditions of welding while retaining said melted metal in a lateral direction.

8. A stud ferrule combination for electrical arc welding comprising: a welding stud including a shank portion having at one end an unfluxed welding end provided with a projection tip, said projection tip including a volume of metal 10% or less of the total metal of the weld end to be deposited as molten metal upon welding; and a ferrule comprising an open ended hollow body defining a weld chamber, one end of said body being adapted to seat on a work member and the other end of said body having an axial opening to loosely receive the shank portion, the cross sectional area of the weld chamber being not less than 1.4 times the cross sectional area of the welding end of the shank portion, said weld chamber having an internal height sufficient to contain under welding gas pressures molten metal from a stud within said chamber.

9. A stud ferrule combination for electrical arc welding comprising: a welding stud having an unfluxed welding end provided with a projection tip of reduced section and predetermined length; and a ferrule comprising an open ended hollow body defining a weld chamber, one end of said body being adapted to seat on a work member and the other end of said body having an axial opening to loosely receive the shank portion, the cross sectional area of the weld chamber being related to the cross sectional area of said welding end and also related to the length of said projection tip whereby the total amount of metal to be melted and deposited from said projection tip and welding end at any instant during a welding operation will produce an accumulated melted deposit of metal ineffective to weaken or extinguish a welding arc.

10. A stud ferrule combination as stated in claim 9 wherein said projection tip includes a volume of metal of less than 10% of the total deposited molten metal.

11. A stud ferrule combination as stated in claim 9 wherein the length of said projection tip may be approximately 3/64 inch to 1/8 inch for stud diameters of 3/16 inch to 5/8 inch respectively.

12. In combination: an unfluxed welding stud having a welding end with a projection tip of predetermined length and volume in relation to said welding end and metal to be deposited therefrom in welding; and a ferrule provided with a weld chamber and an axial opening at one end of said chamber to loosely receive said stud in spaced relation, said diameter of said weld chamber being related to the length of said projection tip and said weld chamber having a volume related to the volume occupied by the welding end and projection tip of a stud in the chamber whereby the differential volume is sufficient to contain molten metal under welding gas pressures while retaining said melted metal in virtually symmetrical form about said welding end whereby a uniform weld and weld fillet is obtained.

13. An integral welding stud for use in combination with a ferrule having a weld chamber of predetermined volume related to said stud comprising: a shank portion; an unfluxed welding end portion; a projection tip on said welding end portion, said projection tip having a volume of 10% or less of the total volume of melted deposited metal from said welding end and tip, said projection tip having a predetermined length related to the cross sectional area of the weld chamber.

14. In the art of welding a stud to a metal workpiece, the combination comprising: a metal stud provided with a welding end portion adapted to be deposited as weld metal during welding and including an integral projection tip, and a refractory sleeve having a weld chamber at one end thereof encircling the welding end portion of said stud, said welding end portion and included projection tip virtually comprising the volume of displaced metal formed into a fillet, after welding, the height of which is substantially smaller than the height of the weld chamber, the height of said weld chamber being sufficient in relation to the lateral dimension of said chamber to contain molten metal under welding gas pressures.

15. A stud ferrule combination for electrical arc welding comprising: a welding stud provided with a welding end including a portion thereof to be deposited as weld metal on a work member during a welding operation; and a ferrule comprising an open-ended hollow body member including a weld chamber, said body member having an axial opening at one end to loosely receive said welding end in spaced relation; said weld chamber having a cross-sectional area and a height related to the cross-sectional area of said portion of said welding end whereby the height of said weld chamber is sufficient to hold in said chamber molten metal under welding gas pressures and against expulsion from said welding chamber.

16. In the art of welding a stud to a workpiece and in combination with a stud having a welding end to be melted, the provision of: a ferrule comprising an open-ended hollow body member defining a weld chamber, said body member having an axial opening at one end to loosely receive a stud, said body member having a plain uninterrupted end face at the other end adapted to be positioned on a workpiece, said welding chamber having a height sufficient in relation to lateral dimensions of said chamber to longitudinally retain molten metal under welding gas pressures and against expulsion from the welding chamber.

References Cited in the file of this patent

UNITED STATES PATENTS

| | | |
|---|---|---|
| 2,413,370 | Palmer | Dec. 31, 1946 |
| 2,447,113 | Candy | Aug. 17, 1948 |
| 2,455,244 | Evans | Nov. 30, 1948 |
| 2,775,685 | Webster | Dec. 25, 1956 |